United States Patent [19]

Callahan, Jr.

[11] Patent Number: 4,630,048

[45] Date of Patent: Dec. 16, 1986

[54] THREE HUNDRED AND SIXTY DEGREE IFF VIDEO RESYNCHRONIZER UNIT

[75] Inventor: Patrick O. Callahan, Jr., Lusby, Md.

[73] Assignee: The United States of America as represented by the Secretary of the Navy, Washington, D.C.

[21] Appl. No.: 392,962

[22] Filed: Jun. 28, 1982

[51] Int. Cl.⁴ .............................................. G01S 13/78
[52] U.S. Cl. ..................................... 342/45; 342/185
[58] Field of Search ............ 343/5 SC, 6.5 R, 6.5 LC

[56] References Cited

U.S. PATENT DOCUMENTS 3,277,466 10/1966 Gardner ........................ 343/5 SC X
4,305,073 12/1981 Curry, Jr. et al. ............... 343/5 SC Primary Examiner—T. H. Tubbesing Attorney, Agent, or Firm—Kenneth E. Walden; Frederick A. Wein; John G. Wynn

[57] ABSTRACT

A 360° IFF video resynchronizer unit for storing pertinent data such as the range, the code, the IFF mode and the azimuth for each reply from associated transponders is disclosed. The 360° IFF video resynchronizer unit is also configured for interfacing with one of a plurality of interrogator subsystems associated with a plurality of radar systems having multiple antennas so as to backup any one of the plurality of interrogator subsystems with a single 360° IFF video resynchronizer unit. In addition, any number of the plurality of interrogator subsystems can be replaced with a single 360° IFF video resynchronizer unit when at least one of the plurality of interrogator subsystems is present.

16 Claims, 4 Drawing Figures

THREE HUNDRED AND SIXTY DEGREE IFF VIDEO RESYNCHRONIZER UNIT

CROSS-REFERENCE TO RELATED APPLICATIONS

The present application is related, in subject matter, to U.S. patent application Ser. No. 392,963 to Callahan, entitled "Digital-To-Composite IFF Video Converter," filed June 28, 1982, and assigned to the same assignee as the present application.

BACKGROUND OF THE INVENTION

1. Field of the Invention

The present invention relates to Identification Friend or Foe (IFF) systems, but more specifically, it relates to a 360° IFF video resynchronizer unit for backing up and/or replacing interrogator subsystems of the IFF systems.

2. Description of the Prior Art

Identification Friend or Foe (IFF), as a technique for recognizing friendly entities, has long been a vital factor in tactical operations. IFF techniques have progressed from the recognition of coats of arms and flags to the present day electronic systems. Present day IFF systems comprise interrogator subsystems and transponder subsystems. The most important function of an interrogator subsystem is to ask the question of all unknown entities, "Who are you?". The most important function of a transponder subsystem is to answer the foregoing. Most present day Navy ships use one interrogator subsystem for each radar system. Some present day Navy ships use up to five or more interrogator subsystems.

At the present time, no backup interrogator subsystems exist. Thus, if one of the interrogator subsystems should fail, the IFF system for that corresponding radar system would not exist. Consequently, there is a need in the prior art to be able to backup any one of the interrogator subsystems.

Moreover, when an interrogator subsystem fails, that particular subsystem must be replaced or repaired. Failure occurs frequently due to the size, weight, complexity and age of the subsystems. Therefore, a need exists in the prior art to replace interrogator subsystems with a state-of-the-art unit, such as the present invention, while reducing costs and increasing reliability. In addition, there is a need in the prior art to be able to substitute such a unit in place of an interrogator subsystem for new construction. At least one interrogator subsystem of the prior art type must be present to use the present invention in the foregoing manner.

There is one well known prior art IFF system (IFF Central System) which can be used to replace and/or substitute for new construction, but, unlike the present invention, this system can not be used to backup interrogator subsystems. Also, the IFF Central System declares targets in order to accomplish the above mentioned task(s) of replacement and/or substitution. Thus, a need exists in the prior art to accomplish the foregoing task and provide backup capability, but yet be able to process replies or returns rather than targets.

The prior art, as indicated hereinabove, includes some important advances in IFF systems. However, insofar as can be determined, no prior art IFF system incorporates all of the features and advantages of the present invention.

OBJECTS OF THE INVENTION

Accordingly, an important object of the present invention is to be able to backup any one of a plurality of interrogator subsystems with a single 360° IFF video resynchronizer unit.

Another important object of the present invention is to be able to replace any number of the plurality of interrogator subsystems with a single 360° IFF video resynchronizer unit.

Yet another important object of the present invention is to convert, in an IFF system, the range, code mode and azimuth data into an IFF composite video format.

Still another important object of the present invention is to process and output replies or returns over 360° of IFF composite video.

A further important object of the present invention is to measurably improve reliability in an IFF system by reducing the system components and complexity.

Still a further important object of the present invention is to reduce RF radiation by resynchronizing composite video from a particular antenna of one of the plurality of interrogator subsystems.

SUMMARY OF THE INVENTION

In accordance with these and other objects and features of the present invention, a 360° IFF video resynchronizer unit stores all pertinent IFF data and is configured to interface with an associated IFF system having multiple radars for recalling the IFF data at a different pulse repetition frequency (PRF), and at a different antenna RPM than the associated IFF system.

The 360° IFF video resynchronizer unit comprises, inter alia, a video resynchronizer input device, an input computer, an output computer and a digital-to-composite IFF video converter. It stores and processes replies or returns without storing targets by inputting the pertinent IFF data in real time, by formatting and storing the IFF data in real time, and by outputting the IFF data, which was stored for a different azimuth, in real time.

BRIEF DESCRIPTION OF THE DRAWINGS

The foregoing objects, other objects, novel features and advantages of the present invention will be more apparent from the following more particular description of the preferred embodiments thereof as illustrated in the accompanying drawings, in which.

DESCRIPTION OF THE PREFERRED EMBODIMENTS

Figure 1:
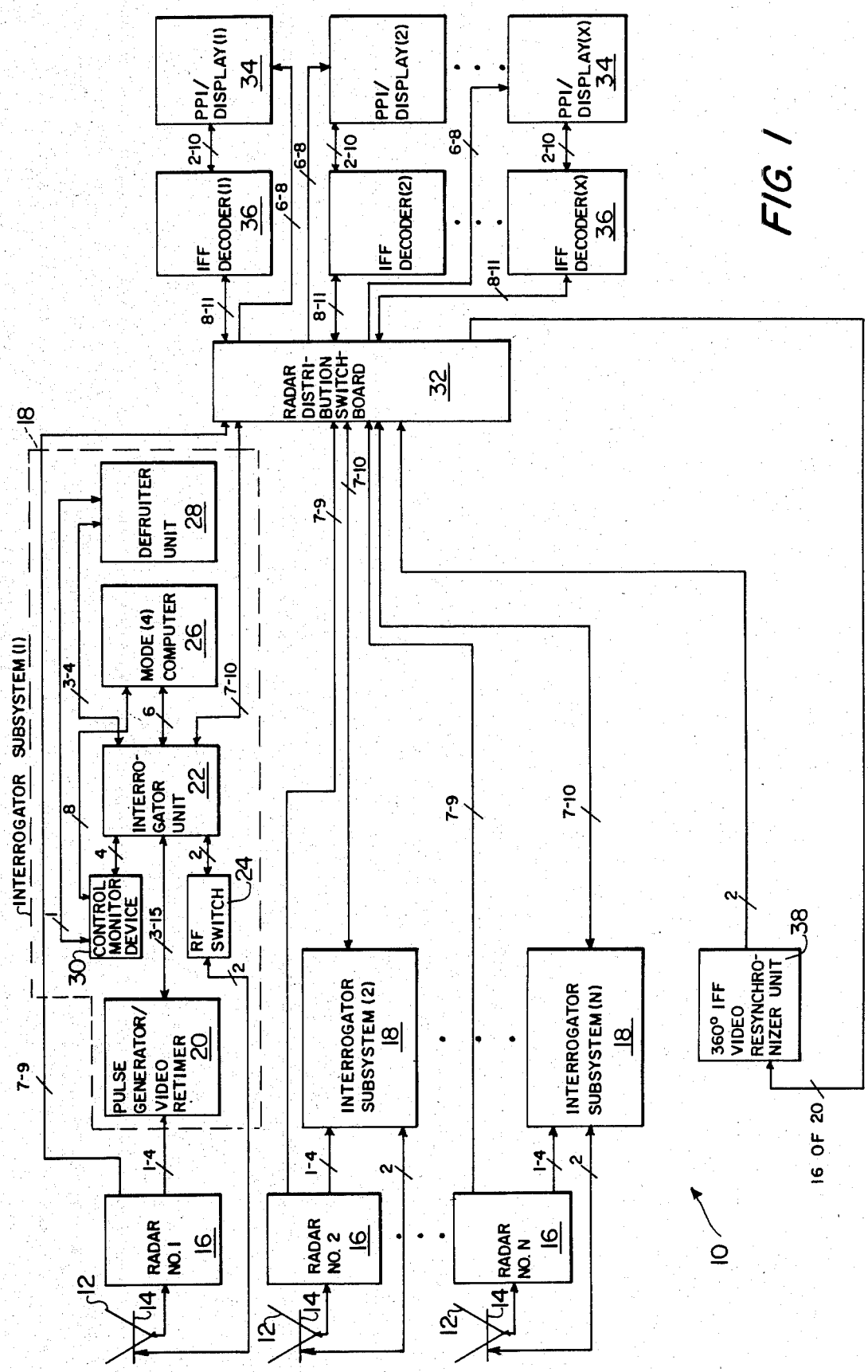
FIG. 1 is block diagram representation of a plurality of IFF interrogator/radar subsystems and a 360° IFF video resynchronizer unit depicted in an interrogator subsystem backup role.

FIG. 1 shows a plurality of IFF interrogator/radar systems 10 in which the present invention is employed. It comprises a plurality of radar antennas 12 and a plurality of IFF antennas 14. The plurality of radar antennas 12 are operatively connected to a plurality of radars 16. Each one of the plurality of radars 16 provides timing and trigger signals to corresponding ones of a plurality of interrogator subsystems 18.

Each one of the plurality of interrogator subsystems 18 comprises a pulse generator/video retimer 20 which is operatively connected to an interrogator unit 22. Interrogation unit 22, in cooperation with an RF switch 24, a mode (4) computer 26, a defruiter unit 28 and a control monitor device 30, generates interrogation signals to a corresponding one of a plurality of transponder systems (not shown) via RF switch 24 and the corresponding one of the plurality of IFF antennas 14. Interrogator unit 22 receives replies or returns from the aforementioned transponder system. Defruiter unit 28 removes non-synchronous replies or returns from the IFF composite video, and mode (4) computer 26 provides the identification function for the associated IFF system. Interrogator unit 22 also provides composite IFF video and mode tags to a radar distribution switch board 32. Control monitor device 30, being operatively connected to interrogator unit 22, mode (4) computer 26 and defruiter unit 28, operates to monitor and control one of the plurality of interrogator subsystems 18.

Radar distribution switchboard 32, being operatively connected to plurality of radars 16 and plurality of interrogator subsystems 18, switches the enable, timing, composite IFF and radar video, mode tags and synchro signals to and from any one of a plurality of PPI/display units 34 via a corresponding plurality of IFF decoders 36. The present invention employs a 360° IFF video resynchronizer unit 38, which is operatively connected to radar distribution switchboard 32 so as to backup any one of plurality of interrogator subsystems 18, aforementioned.

Figure 2:
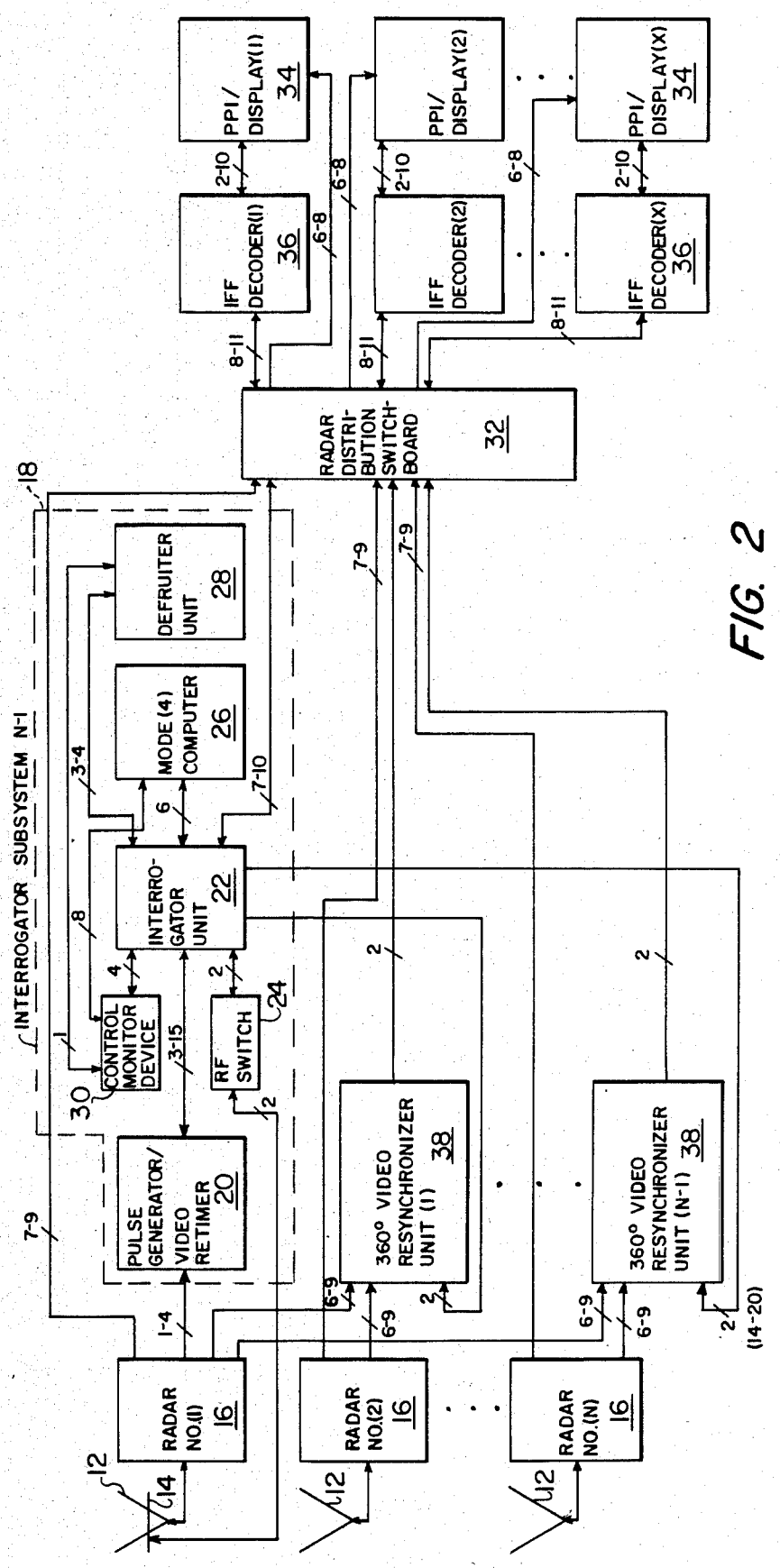
FIG. 2 is a block diagram representation of a plurality of IFF interrogator/radar systems and a plurality of the 360° IFF video resynchronizer units depicted in an interrogator subsystem replacement role.

FIG. 2 shows another embodiment of the present invention in which a plurality of 360° IFF video resynchronizer units 38 (up to N−1 units) can be operatively connected to a corresponding plurality of radars 16. It should be mentioned that at least one of the plurality of interrogator subsystems 18, in combination with one of the plurality of radars 16, is required so as to have available the pertinent IFF data. The plurality of 360° IFF video resynchronizer units 38 are operatively connected to radar distribution switchboard 32 and one of the plurality of interrogator subsystems 18 in such a fashion as to replace the other of the plurality of interrogator subsystems 18. Replacing the other of the plurality of ihterrogator subsystems 18, as shown, improves the overall IFF system by reducing the number of RF interrogations, increasing system reliability and reducing system costs.

Figure 3A:
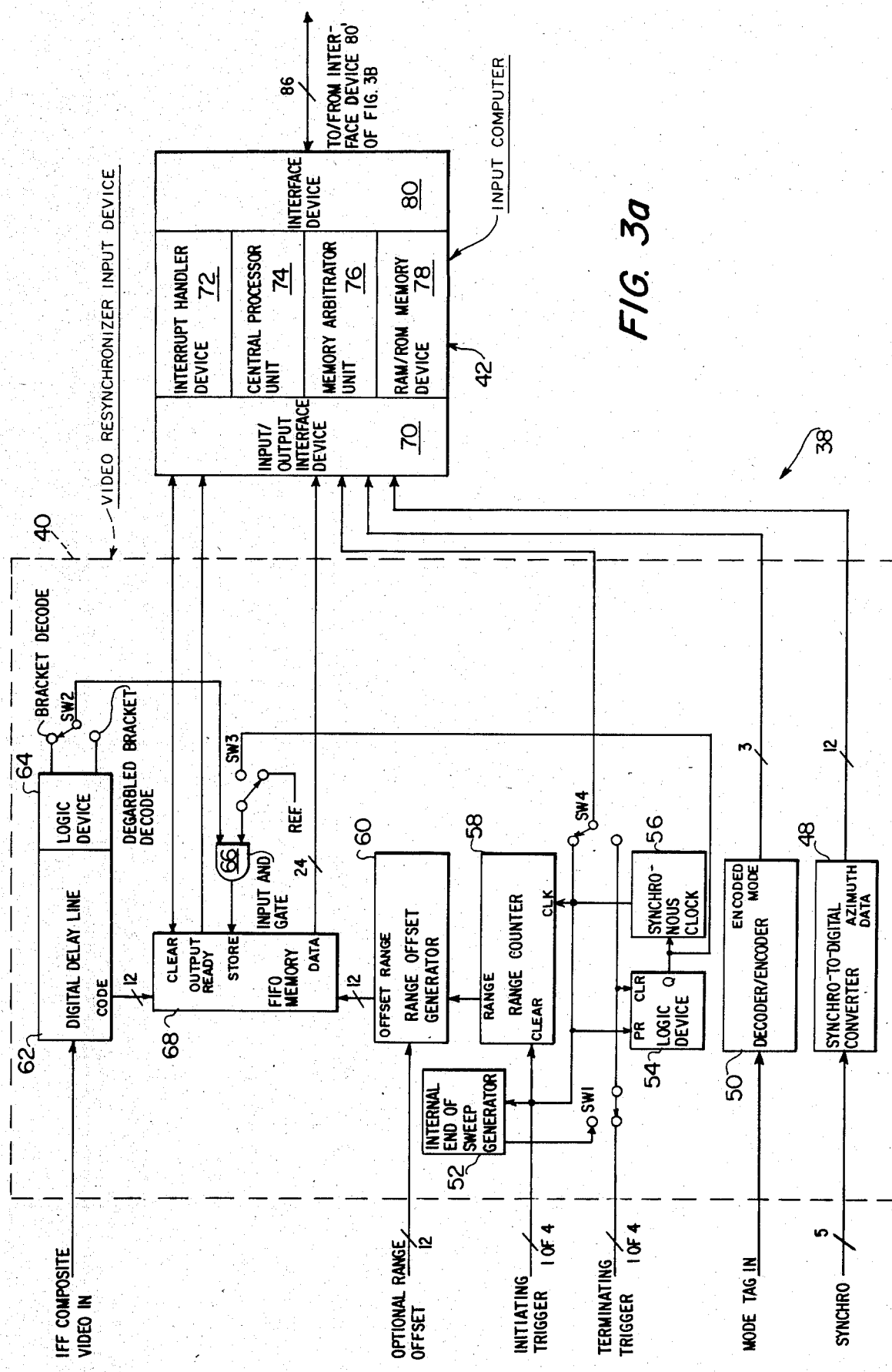
FIGS. 3a and 3b show a more particularized block diagram representation of the 360° IFF video resynchronizer unit of FIGS. 1 and 2, according to the present invention.
Figure 3B:
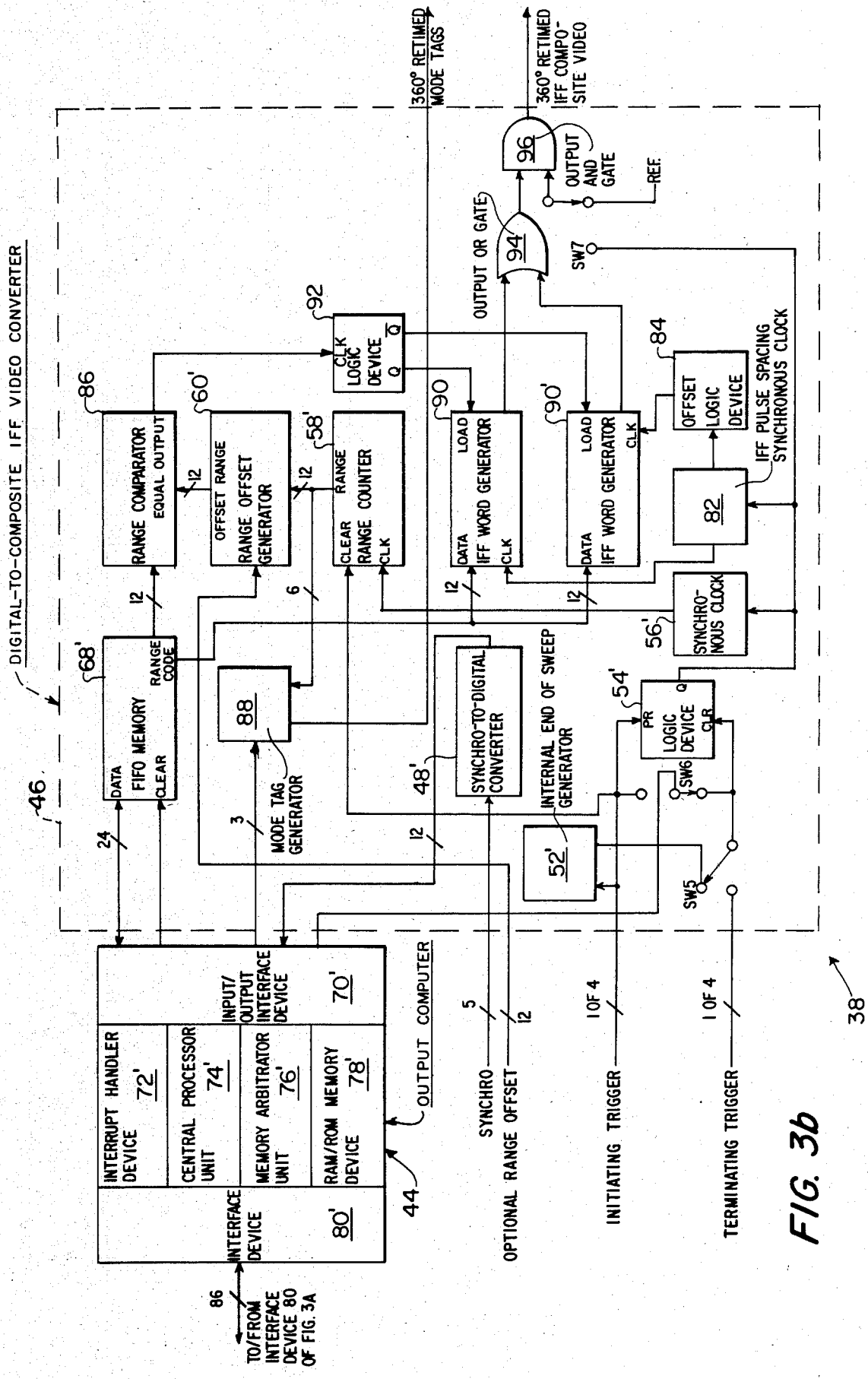

FIGS. 3a and 3b show, in block diagram form, a more particularized embodiment of the 360° IFF video resynchronizer unit 38 of FIG. 1 or any one of the plurality of 360° IFF video resynchronizer units 38 of FIG. 2. It comprises a video resynchronizer input device 40, an input computer 42, an output computer 44 and a digital-to-composite IFF video converter 46.

Video resynchronizer input device 40 inputs IFF composite video, initiating and terminating triggers, and mode tag and synchro inputs, and formats this pertinent data for all replies or returns in the fashion of range, code mode and azimuth to input computer 42. Input computer 42 stores this pertinent data. Output computer 44 recalls the pertinent data. Digital-to-composite IFF video converter 46 cooperates with output computer 44 such that the pertinent data is formatted into retimed IFF composite video.

Video resynchronizer input device 40 comprises a synchro-to-digital converter 48 for converting the synchro input into digital words. It then feeds this information to input computer 42 for further processing. A decoder/encoder 50 converts the mode tag input into an encoded mode tag word which is also fed to input computer 42 for further processing. An internal end of sweep generator 52 inputs the initiating trigger, and should switch SW1 be set, provides an internal trigger to replace the terminating trigger. A logic device 54 is preset by the aforementioned internal trigger and cleared by the terminating trigger. A synchronous clock 56 is controlled by logic device 54. Synchronous clock 56 is connected the clock input to a range counter 58 which is cleared by the initiating trigger. The output of range counter 58 is connected to a range offset generator 60, which allows a range offset to be applied to the range of each reply or return via an optional range offset applied at its input.

Still referring the block diagram representation of FIGS. 3a and 3b video resynchronizer input device 40 further comprises a digital delay line 62 for converting the IFF composite video into parallel digital video. A logic device 64 provides bracket decodes and degarbled bracket decodes for selection by a switch SW2. A switch SW3, in combination with an input AND gate 66, provides end of sweep capability to terminate video storage upon the internal end of sweep generator trigger or the terminating trigger as selected by switch SW1. A first-in-first out (FIFO) memory 68 is operatively connected to input computer 42. FIFO memory 68 stores the range and code information for all replies or returns. A switch SW4 provides the selection for either the initiating trigger or terminating trigger to interrupt input computer 42. The selection depends on the radar system used.

Input computer 42 comprises an input/output interface device 70, an interrupt handler device 72, a central processor unit (CPU) 74, a memory aribitrator unit 76, a RAM/ROM memory device 78, and an interface unit 80.

Likewise, output computer 44 comprises an input-/output interface device 70', an interrupt handler device 72', a central processor unit (CPU) 74', a memory aribitrator unit 76', a RAM/ROM memory device 78', and an interface unit 80'For purposes of the present invention, input computer 42 and output computer 44 each can be an Intel ® iSBC 80/30 computer.

Continuing, input computer 42 is interrupted by either the initiating trigger or terminating trigger which is selected by switch SW4. Input computer 42 clears FIFO memory 68 and inputs the azimuth from synchro-to-digital converter 48 and the mode tag encoded signal from decoder/encoder 50. The value of the azimuth that is inputted from synchro-to-digital converter 48, points to a location in RAM/ROM memory 78 and/or 78' which contains address pointers to other locations in memory in which all of the returns are stored for 360° of IFF operation. Each time FIFO memory 68 asserts that data is available for input computer 42, it interrupts input computer 42 which stores the next reply in the locations in RAM/ROM memory 78 and/or 78', aforementioned. Output computer 44 inputs, upon receipt of an interrupt signal from digital-to-composite IFF video converter 46, the azimuth therefor, and then determines where the returns for that azimuth are in RAM/ROM memory 78 and/or 78'. It then outputs the returns to digital-to-composite IFF video converter 46.

Still referring to the block diagram of FIGS. 3a and 3b, digital-to-composite IFF video converter 46 comprises a synchro-to-digital converter 48', an internal end of sweep generator 52', a logic device 54', a synchronous clock 56', a range counter 58', a range offset generator 60', and a FIFO memory 68'. Digital-to-composite IFF video converter 46 further comprises an IFF pulse spacing synchronous clock 82, an offset logic device 84, a range comparator 86, a mode tag generator 88 an IFF word generator 90, an additional IFF word generator 90', a logic device 92, an output OR gate 94, and an output AND gate 96.

For purposes of the present invention, logic devices 54, 54' and 92 can be "D" flip-flop type integrated circuits or their discrete component counterparts. In a "D" flip-flop, data at the "D" input (internally connected and not shown) are transferred to the Q and $\overline{Q}$ outputs on the positive going edges of clock pulses at the clock (CLK) input, unless there is activity at the preset (PR) input or clear (CLR) input. If the PR input is active, then the Q output is set and the $\overline{Q}$ output is reset. If the CLR input is active, then the reverse of the foregoing occurs. Also, the functions of logic devices 64 and 84 and the circuitry to carry out same are well known in the prior art. Circuitry to generate the bracket decode and degarbled bracket decode signals of logic device 64 in cooperation with a digital delay line 62 or similar device is well known in the prior art. A device for carrying-out the foregoing function is well documented in the publication edited by Merril Skolnik entitled "Radar Handbook", McGraw-Hill Book Company, pages 38-18 through 38-24, 1970. The foregoing or similar circuitry is also available from other sources in the broad range of IFF publications. Finally, an example of circuitry to perform the function of logic device 84 is a monostable multivibrator, which is a circuit having one stable state and one unstable state. A trigger signal is required to drive the circuit into the unstable state, where it remains for a predetermined time before returning to the stable state.

To continue, synchro-to-digital converter 48' inputs synchro information from the radar antenna (see FIGS. 1 and 2) and outputs this information to input/output interface device 70' of output computer 44. An internal end of sweep generator 52' inputs an initiating trigger and outputs an internal end of sweep trigger which can be selected by switch SW5 for interfacing with certain radars. Logic device 54', via switch SW5, starts upon the initiating trigger selected and stops upon the terminating trigger selected. Range counter 58' is cleared by a selection of the initiating or terminating trigger as selected by switch SW6. Range offset generator 60' adds an additional offset to the range of all replies or returns via an optional range offset applied at its input.

FIFO memory 68' receives range and code information from input/output interface device 70' of output computer 44. IFF pulse spacing synchronous clock 82 delivers the appropriate pulse spacing clocks for proper operation of IFF word generator 90 and IFF word generator 90' via offset logic device 84. The foregoing clock connections allow both IFF word generators 90 and 90' to operate to output interleaved IFF video trains. Range comparator 86 compares the range information outputted from FIFO memory 68' with the range information from range offset generator 60'. Mode tag generator 88 receives information from input/output interface device 70' of output computer 44. Mode tag generator 88 has as an additional input, information from range counter 58'. The output of mode tag generator 88 comprises mode tags that have been retimed by input and output computers 42 and 44.

Continuing with the description of digital-to-composite IFF video converter 46, IFF word generators 90 and 90' have as inputs, code from FIFO memory 68' and load inputs from a logic device 92. Logic device 92 is driven by range comparator 86. Consequently, IFF word generator 90 outputs a digital signal to an output OR gate 94. Similarly, IFF word generator 90' outputs a digital signal to output OR gate 94, but offset by a sufficient amount to allow recognition of both interleaved selective identification feature (SIF) trains. (This is the standard IFF train for non-mode (4) replies.) Thus, output OR gate 94 "OR"s the previously mentioned digital signals. Switch SW7 allows termination of 360° retimed IFF composite video upon an end of sweep trigger in conjunction with an output AND gate 96.

To make clear how the various inputs and outputs of FIGS. 3a and 3b are related to those of FIGS. 1 and 2, reference should first be made to FIGS. 1, 2 and 3a as viewed concurrently. Thus, the inputs to a particular 360° IFF video resynchronizer unit 38 are synchro, mode tag in, terminating trigger, initiating trigger, optional range offset and IFF composite video in. Still referring to FIGS. 1 and 2, but now to FIG. 3b as viewed concurrently, the outputs of a particular 360° IFF video resynchronizer unit 38 are 360° retimed mode stages and 360° retimed IFF composite video. Also, additional inputs to a particular 360° IFF video resynchronizer unit 38, as shown in FIG. 3b, are another synchro, another optional range offset, another initiating trigger and another terminating trigger. The origin of the aforementioned input signals are clearly shown for the first and second embodiments of the present invention in FIG. 1 and FIG. 2, respectively.

STATEMENT OF THE OPERATION

Details of the operation, according to the present invention are explained in conjunction with the block diagram of FIGS. 3a and 3b.

The process of storing and recalling IFF replies or returns is accomplished by formatting the range, code, mode and the azimuth in video resynchronizer input device 40 for use by input computer 42. The azimuth mode, code and range are stored in RAM/ROM memory 78 and/or 78' for each interrogation and each reply to that interrogation by input computer 42. RAM/ROM memories 78 and 78' are formatted in such a manner that a function of the azimuth can be used to point to a location in memory. In memory, an encoded mode word describes which mode has been interrogated, if any. Successive words in memory contain the range and code for each return of that interrogation. A unique word or code describing the number of returns can be stored in RAM/ROM memory 78 and/or 78' to indicate the number of replies or returns present for that interrogation.

Input computer 42 and output computer 44 are used in inputting and outputting the replies, ranges, codes, modes and azimuths. Input computer 42 inputs the azimuth and the mode for each interrogation upon receipt of an initiating trigger, which may be one of several triggers based upon the radars used. Input computer 42 will then input all returns from the previously mentioned transponder systems. Input computer 42 formats range and code and stops inputting the returns upon receipt of a terminating trigger if switch SW3 has been set. Switch SW2 allows for the selection of either bracket decode or degarbled bracket decode. The terminating trigger selected will depend upon which radar system is used with 360° IFF video resynchronizer unit 38.

Output computer 44 inputs azimuth information from synchro-to-digital converter 48' for generating a desired display of the 360° retimed IFF composite video and mode tags at that particular azimuth. Output computer 44 uses the azimuth to obtain the encoded mode word, ranges, and codes for that azimuth, if any. Output computer 44 outputs the encoded mode word (if any) and the range and code for each IFF reply or return stored in RAM/ROM memory 78 and/or 78'. When output computer 44 has completed the foregoing tasks, it waits for another initiating or terminating trigger as selected by switch SW6 before generating IFF information at the new azimuth. Output computer 44 is capable of outputting the same azimuth information for as long as desired.

Digital-to-IFF composite video converter 46 inputs the range and code for each return and converts this data into IFF composite video The IFF composite video is a format used by decoders 36 and PPI/displays 34 (refer to FIGS. 1 and 2) on almost all Navy ships.

Digital-to-IFF composite video converter 46 is capable of being interfaced with a variety of other IFF processors and will allow the processors to output IFF composite video (but not retimed 360° composite video).

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A 360° IFF video resynchronizer for storing and processing IFF data (returns) from an associated IFF system having multiple radar(s) for recalling the IFF data at a different pulse repetition frequency (PRF) and at a different antenna RPM than the associated IFF system, comprising:

a video resynchronizer input device operatively connected to the associated IFF system for formatting IFF composite video, initiating trigger, terminating trigger, mode tag and synchro information (pertinent data) for all IFF returns, in the fashion of range, code, mode and azimuth information;

an input computer operatively connected to said video resynchronizer input device for storing the range, code, mode and azimuth information for each IFF interrogation in a memory thereof, the memory being formatted in such a manner that the azimuth information points to predetermined locations therein, successive words in memory containing the range and code (entry) for each IFF return of that interrogation;

an output computer operatively connected to said input computer for storing the range, code mode and azimuth information for each IFF interrogation in a memory thereof, the memory being formatted in such a manner that the azimuth information points to predetermined locations therein, successive words in memory containing the range and code (entry) for each IFF return of that interrogation, said output computer generating for a particular azimuth 360° retimed IFF composite video, and retimed mode tags in a digital format; and a digital-to-composite IFF video converter operatively connected to the associated IFF system and said output computer for converting the range, code and mode in the digital format into a retimed IFF composite video format for subsequent display on an associated PPI/display unit and/or decoder.

2. The video resynchronizer of claim 1 wherein said video resynchronizer input device further comprises:

a digital delay line for converting the IFF composite video into parallel digital video information;

means operatively connected to said digital delay line for storing the parallel digital video information and outputting it on a first in first out basis;

a synchronous clock for generating a set of clock pulses for proper timing of said video resynchronizer input device, said synchronous clock being started by the initiating trigger and being halted by the terminating trigger;

a range counter operatively connected to said means for storing and being cleared by the initiating trigger or terminating trigger and being driven by said synchronous clock for counting the number of clock cycles therefrom; and logic means operatively connected to said digital delay line, said means for storing and said synchronous clock such that the IFF composite video, initiating trigger, terminating trigger, mode tag, and synchro information for all IFF returns after being formatted in the fashion of range, code, mode and azimuth information are transferred to said input computer.

3. The video resynchronizer of claim 2 further comprising a synchro-to-digital converter operatively connected to radar antennas of the associated radar(s) for converting information therefrom into addresses which point to the predetermined locations in the memory of said input computer in which all of the IFF returns are stored for 360° of IFF operation.

4. The video resynchronizer of claim 3 further comprising a range offset generator operatively connected between said means for storing and said range counter for generating a predetermined offset range.

5. The video resynchronizer of claim 4 further comprising a decoder/encoder operatively connected to said input computer for converting the mode tags into encoded mode tag words.

6. The video resynchronizer of claim 5 further comprising an internal end of sweep generator being driven by the initiating trigger for generating an internal end of sweep trigger to replace the terminating trigger depending on the associated radar(s) used.

7. The video resynchronizer of claim 6 wherein said logic means further comprises:

a first logic device operatively connected to said synchronous clock, and operating so as to start upon the initiating trigger being selected and so as to stop upon the terminating trigger being selected;

a second logic device operatively connected to said digital delay line and said means for storing for generating bracket decodes and degarbled bracket decodes; and an input AND gate operatively connected to said first logic device, said second logic device and said means for storing so as to terminate video storage in said means for storing upon an initiating trigger selected or upon a terminating trigger selected.

8. The video resynchronizer of of claim 7 further comprising:
- a first switch operatively connecting the internal end of sweep trigger and the terminating trigger so as to select the internal end of sweep trigger to replace the terminating trigger depending on the associated radar(s) used;
- a second switch operatively connected to said first switch and said input computer so as to select the terminating or end of sweep trigger, or the initiating trigger for interruption thereof;
- a third switch operatively connected to said second logic device and said input AND gate for selecting the bracket decodes or the degarbled bracket decodes; and
- a fourth switch operatively connected to a reference source, said input AND gate, and said first logic device such that, if desired, the IFF composite video to said input computer is terminated upon an end of sweep trigger or a terminating trigger, or, if desired, the IFF composite video is passed whenever present.

9. The video resynchronizer of claim 8 wherein said digital-to-composite IFF video converter further comrpises:
- means for storing the range and code information (an entry) from said output computer and outputting it on a first in first out basis;
- a range comparator operatively connected to said means for storing for comparing the range of an IFF return with a predetermined offset range;
- a first IFF word generator operatively connected to said means for storing and said range comparator for performing parallel to serial conversion with reload capability prior to the complete outputting of a digital signal;
- a second IFF word generator operatively connected to said means for storing and said range comparator for performing parallel to serial conversion with reload capability prior to the complete outputting of a digital signal;
- clock means for generating first, second and third sets of clock pulses for proper timing of said converter, said clock means being started by an initiating trigger and being halted by a terminating trigger from the associated radar(s);
- a range counter operatively connected to said range comparator and being cleared by the initiating trigger or terminating trigger and being driven by the first set of clock pulses for counting the number of clock cycles; and
- logic means operatively connected to said range comparator, said first IFF word generator, said second IFF digital word generator, and said clock means such that multiple IFF composite video trains corresponding to the IFF returns are interleaved one with the other.

10. The converter of claim 9 further comprising a synchro-to-digital converter operatively connected to radar antennas of the associated radar(s) for converting azimuth information therefrom into addresses which point to particular locations in the memory of said output computer in which all of the IFF returns are stored for 360° of IFF operation.

11. The converter of claim 10 further comprising a range offset generator operatively connected between said range comparator and said range counter for generating the predetermined offset range.

12. The converter of claim 11 further comprising a mode tag generator operatively connected to said output computer and said range counter for generating 360° retimed mode tags.

13. The converter of claim 12 further comprising an internal end of sweep generator being driven by the initiating trigger for generating an internal end of sweep trigger to replace the terminating trigger depending on the associated radar(s) used.

14. The converter of claim 13 wherein said clock means further comprises:
- a synchronous clock for generating the first set of clock pulses in response to the initiating trigger; and
- an IFF pulse spacing synchronous clock being operatively connected to said first and second IFF word generators for providing the second and third sets of pulses, respectively, so as to deliver the appropriate pulse spacing clocks for proper operation of said first and second IFF word generators.

15. The converter of claim 14 wherein said logic means further comprises:
- a first logic device operatively connected to said clock means, and operating so as to start upon the initiating trigger being selected and so as to stop upon the terminating trigger being selected;
- an offset logic device operatively connected to said IFF pulse spacing synchronous clock and said second IFF word generator for providing, from said third set of clock pulses, an offset set of clock pulses to allow the multiple IFF composite video trains corresponding to the IFF returns to be interleaved one with the other;
- a second logic device operatively connected to said range comparator and said first and second IFF word generators such that when said range comparator detects that the predetermined offset range is equal to the range information from said means for storing, said second logic device generates a load signal to one or the other of said first or second IFF word generators, the particular one thereof chosen then loading code from said means for storing;
- an output OR gate operatively connected to said first and second IFF word generators for "OR"ing the outputs thereof; and
- an output AND gate operatively connected to said output OR gate and said first logic device such that, if desired, the IFF composite video is terminated upon an internal end of sweep trigger generated by an internal end of sweep generator, or a terminating trigger, or, if desired, the IFF composite video is passed whenever present.

16. The converter of claim 15 further comprising:
- a first switch operatively connecting the internal end of sweep trigger and the terminating trigger so as to select the internal end of sweep trigger to replace the terminating trigger depending on the associated radar(s) used;
- a second switch operatively connected to said first switch and said output computer so as to select the terminating or end of sweep trigger, or the initiating trigger for interruption thereof; and
- a third switch operatively connected to a reference source, said output AND gate, and said first logic device such that, if desired, the IFF composite video is terminated upon an end of sweep trigger or a terminating trigger, or, if desired, the IFF composite video is passed whenever present.

* * * * *